United States Patent
Hongo et al.

(10) Patent No.: US 8,270,795 B2
(45) Date of Patent: Sep. 18, 2012

(54) HOLLOW FIBER FORMED USING METAL NANO PARTICLES

(75) Inventors: Akihito Hongo, Hitachi (JP); Yoshinori Kurosawa, Hitachinaka (JP); Masahiro Ohkawa, Hitachi (JP); Hiroaki Takamiya, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 13/222,479

(22) Filed: Aug. 31, 2011

(65) Prior Publication Data

US 2011/0317970 A1 Dec. 29, 2011

Related U.S. Application Data

(62) Division of application No. 12/389,005, filed on Feb. 19, 2009, now Pat. No. 8,121,452.

(30) Foreign Application Priority Data

Feb. 20, 2008 (JP) .................................. 2008-39303
Feb. 26, 2008 (JP) .................................. 2008-44296

(51) Int. Cl.
G02B 6/032 (2006.01)
G02B 6/00 (2006.01)
B05D 7/22 (2006.01)
B05D 5/06 (2006.01)
B32B 1/08 (2006.01)

(52) U.S. Cl. ....................................... 385/125; 427/235

(58) Field of Classification Search ................. 427/235, 427/163.2; 428/34.1, 34.6; 385/125–129, 385/147
See application file for complete search history.

(56) References Cited

U.S. PATENT DOCUMENTS

| | | | | |
|---|---|---|---|---|
| 5,325,458 A | * | 6/1994 | Morrow et al. | 385/125 |
| 5,729,646 A | * | 3/1998 | Miyagi et al. | 385/125 |
| 5,957,858 A | * | 9/1999 | Micheels et al. | 600/529 |
| 5,995,696 A | * | 11/1999 | Miyagi et al. | 385/125 |
| 7,085,024 B2 | * | 8/2006 | Ishimoto et al. | 359/2 |
| 7,664,356 B2 | * | 2/2010 | Hongo et al. | 385/125 |
| 2011/0032620 A1 | * | 2/2011 | Park et al. | 359/585 |

FOREIGN PATENT DOCUMENTS

| | | |
|---|---|---|
| JP | 10-504656 T | 5/1998 |
| JP | 2005-227707 A | 8/2005 |
| JP | 2007-286315 A | 11/2008 |
| WO | WO 95/19580 | 7/1995 |

OTHER PUBLICATIONS

Satoshi Kubota et al., "Fabrication of Low-Loss Silver Hollow Glass Waveguides by Silver Mirror Reaction Method", Laser Engineering, The Laser Society of Japan, Jun. 1997, vol. 25, pp. 438-441.
Yuji Matsuura et al., "Aluminum-coated hollow fiber for excimer laser", Optical Alliance, Japan Industrial Publishing Co., Ltd., Jul. 1999, pp. 20-22.
J. Harrington, "A Review of IR Transmitting, Hollow Waveguides", Fiber and Integrated Optics, vol. 19, pp. 211-227, (2000).

* cited by examiner

*Primary Examiner* — Akm Ullah
(74) *Attorney, Agent, or Firm* — Foley & Lardner LLP

(57) ABSTRACT

A hollow fiber has a hollow tube, a reflecting film formed on an inner wall of the hollow tube, and the reflecting film is a first metal film formed by baking a first metal nano particle solution including a first metal nano particle. The hollow fiber may have a transparent film on the first metal film. The transparent film is formed by baking or chemically reacting from a second metal nano particle included in a second metal nano particle solution.

3 Claims, 14 Drawing Sheets

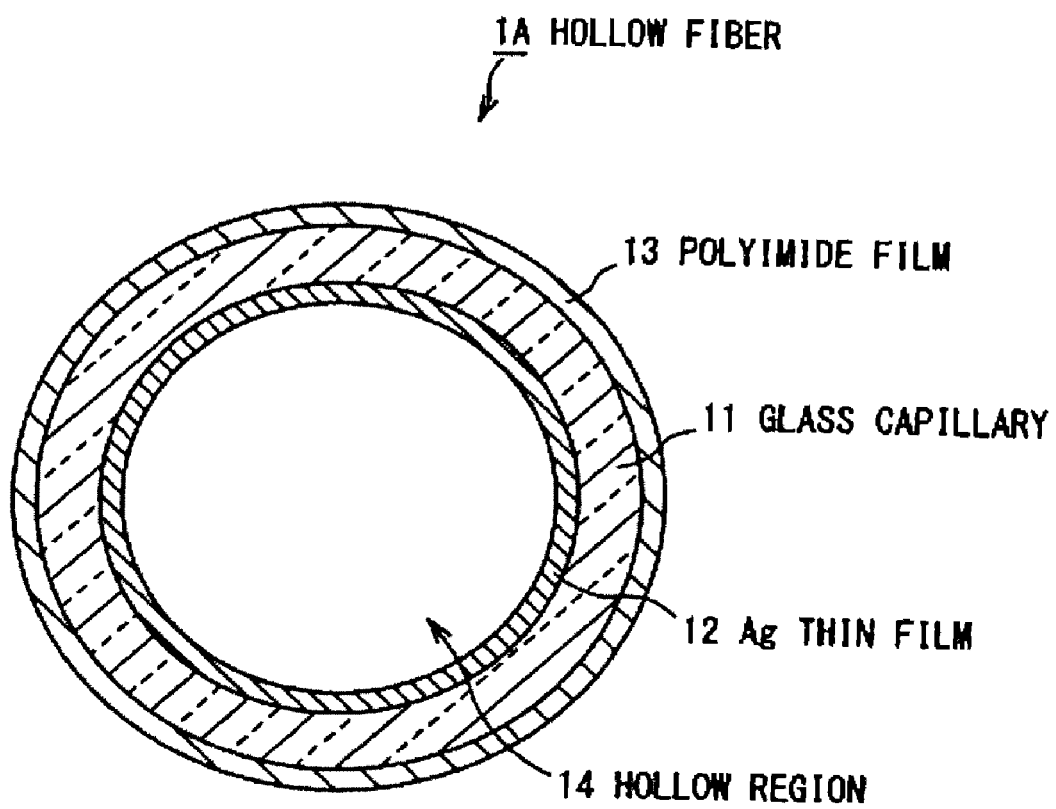

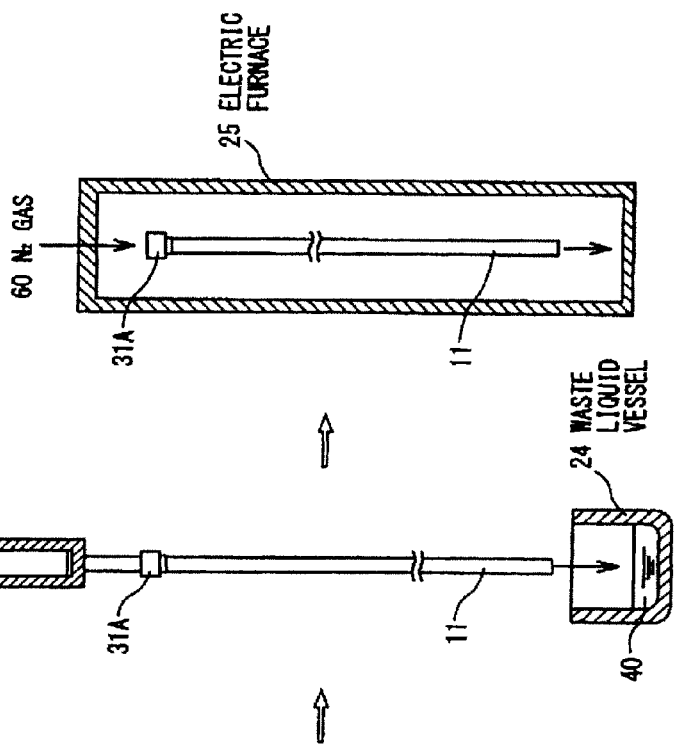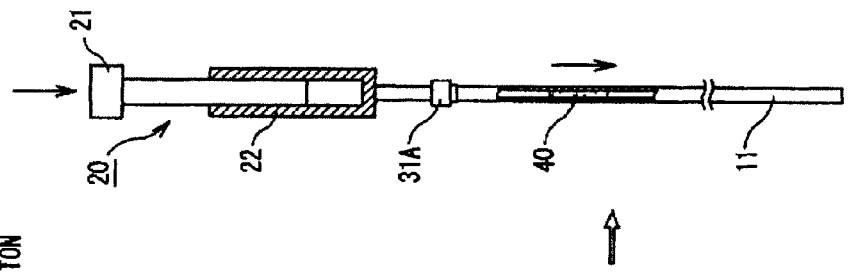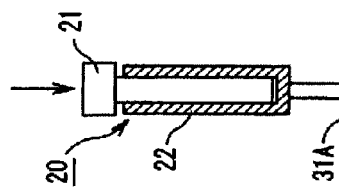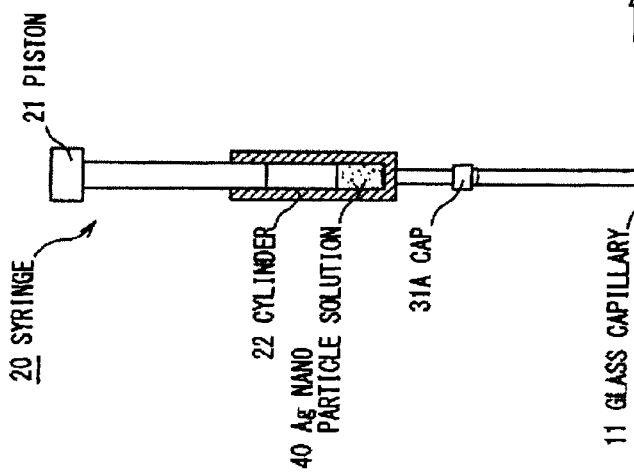

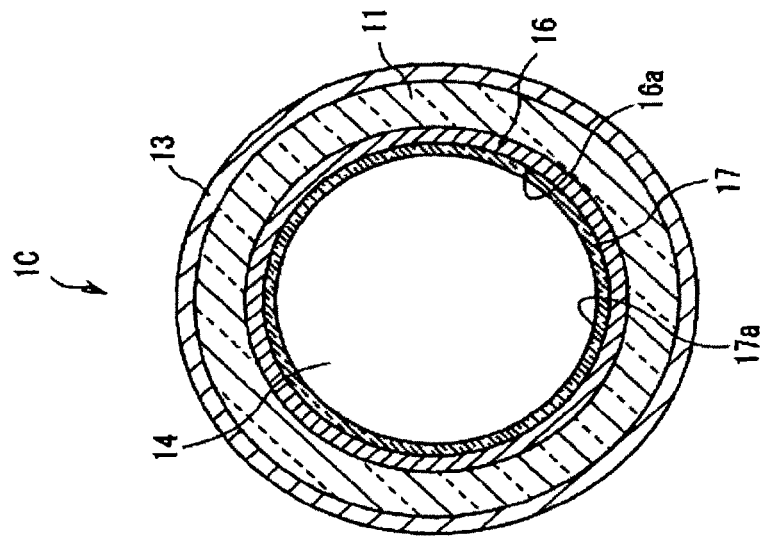
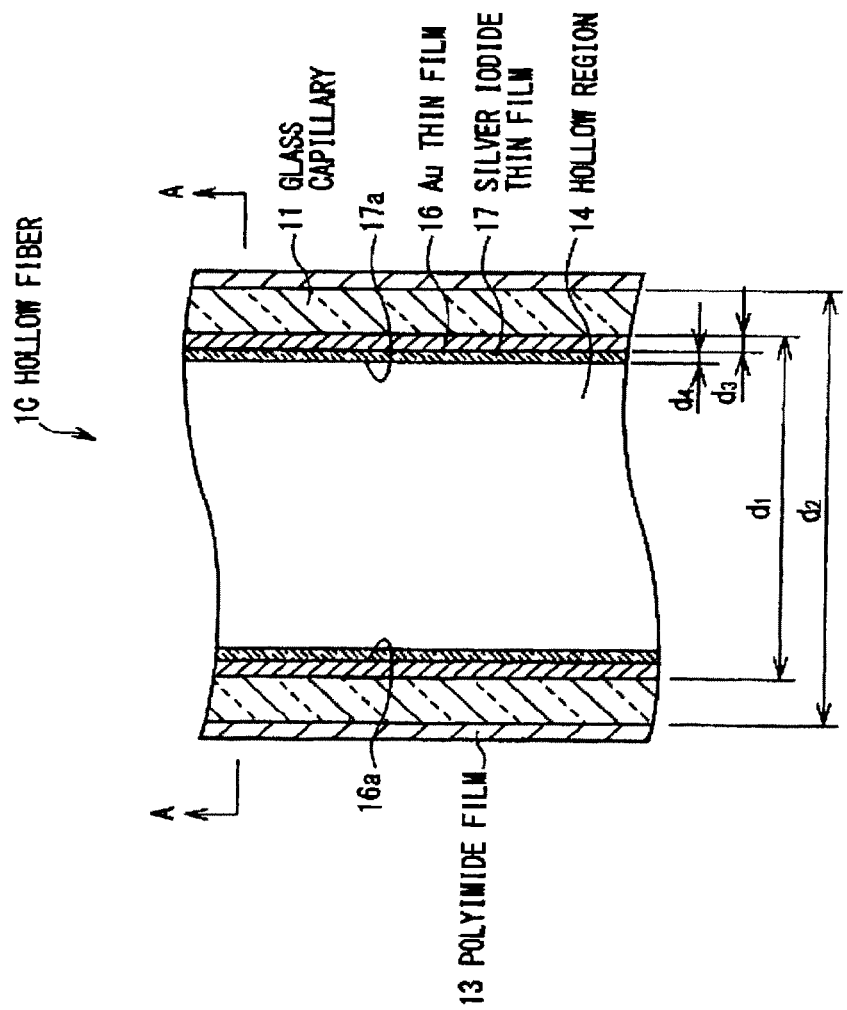

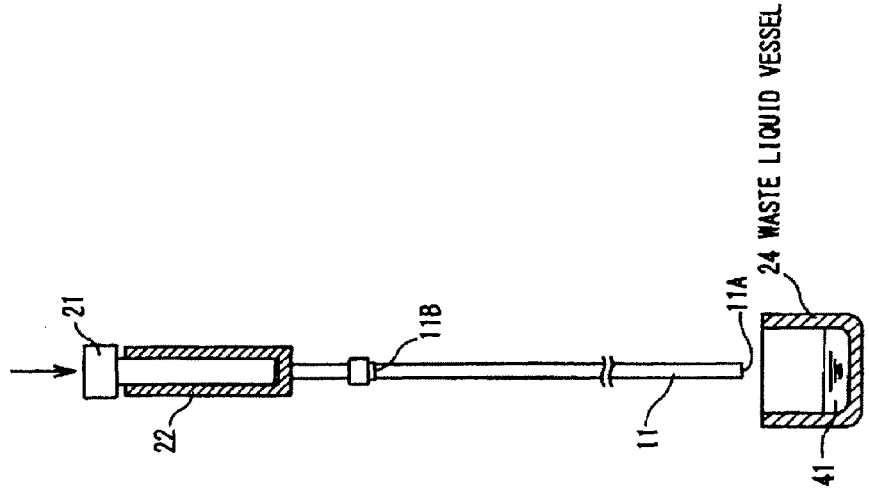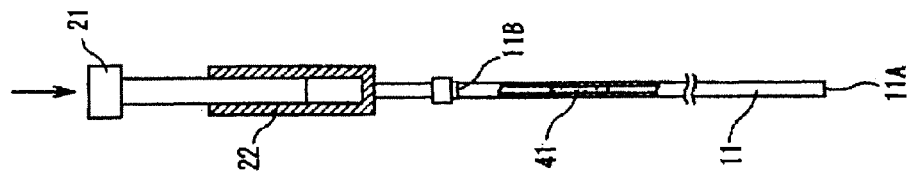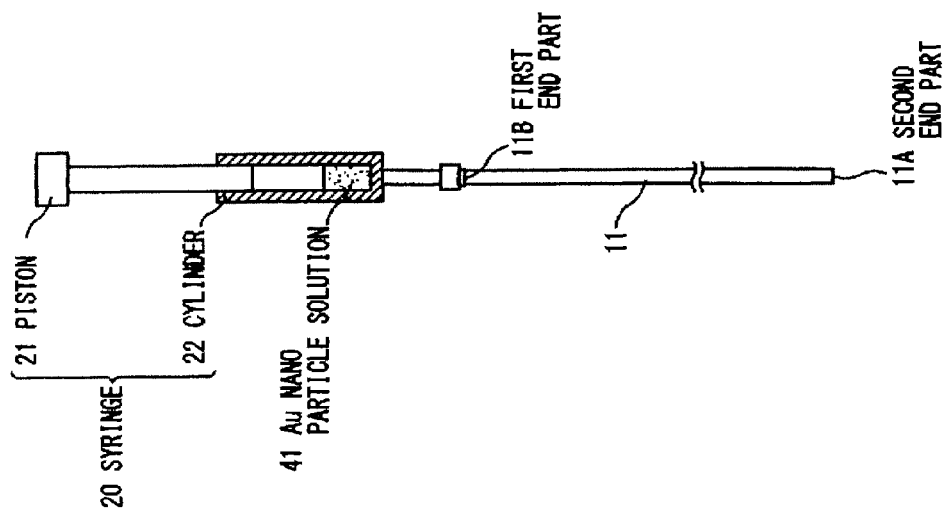

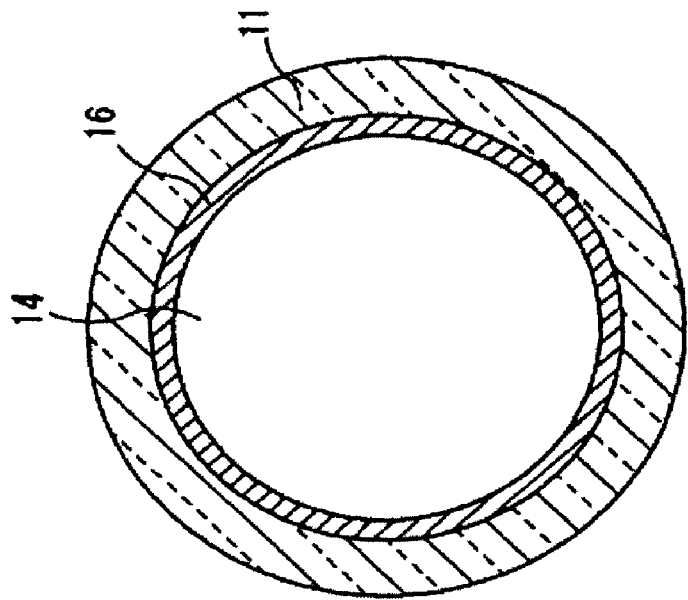
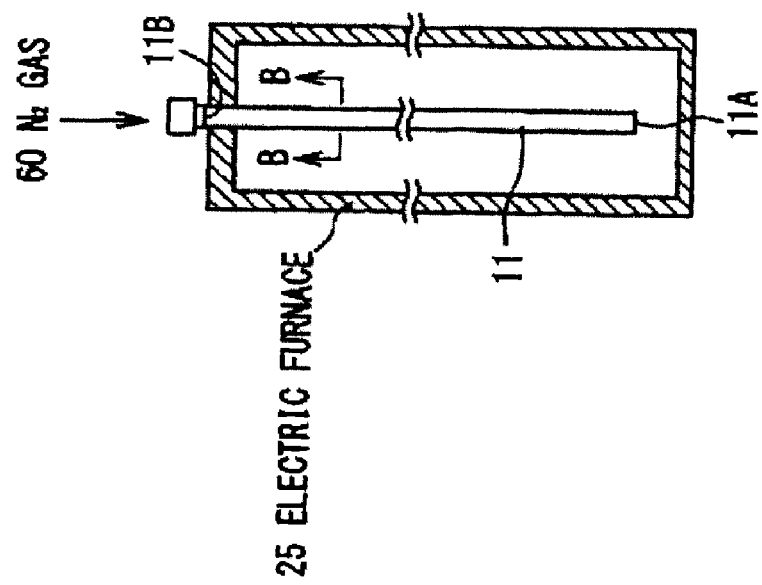

12 Ag THIN FILM

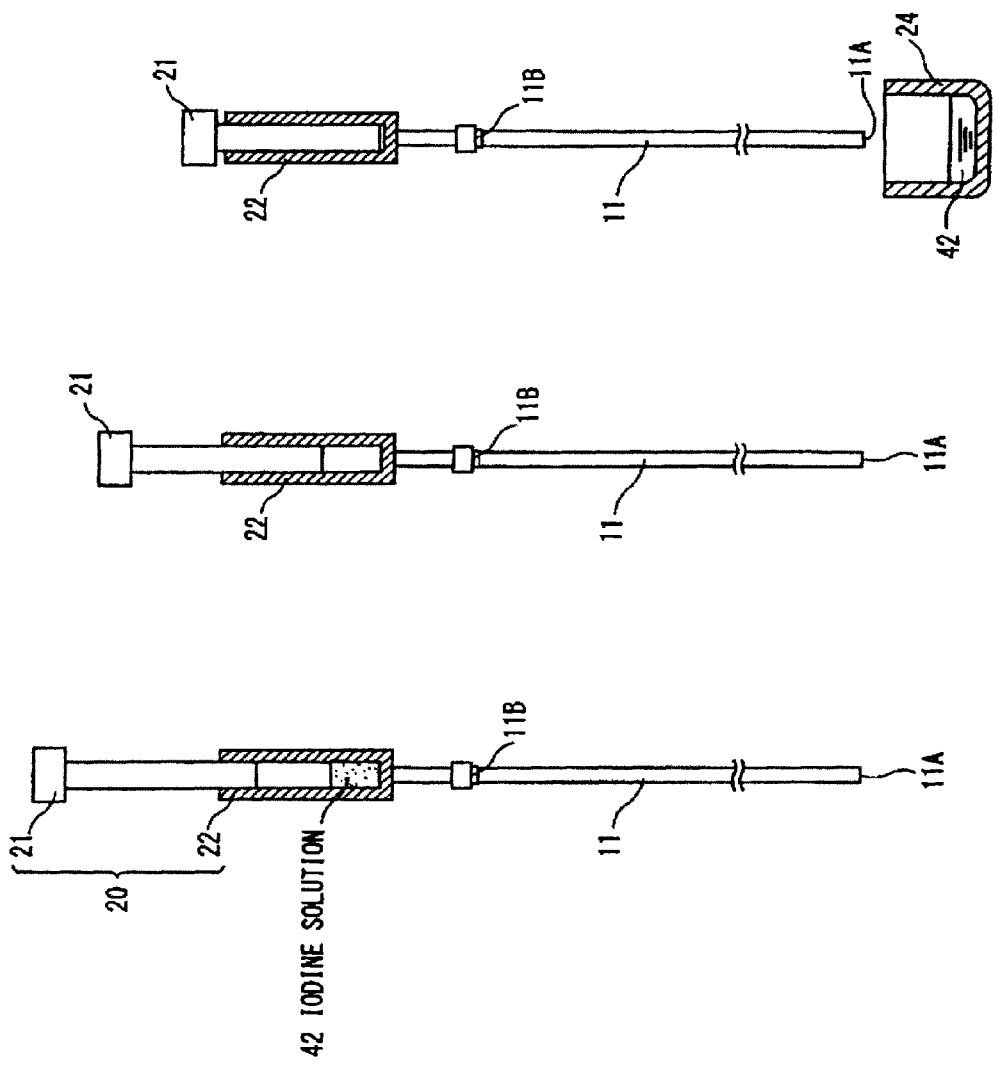

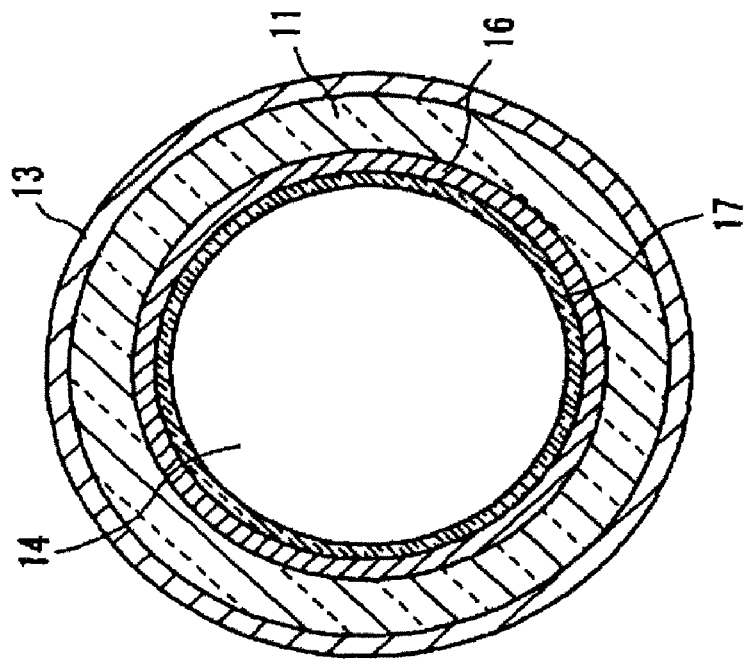
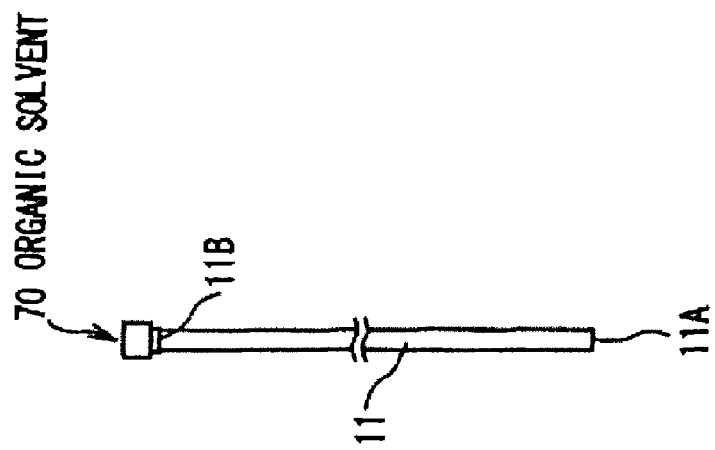

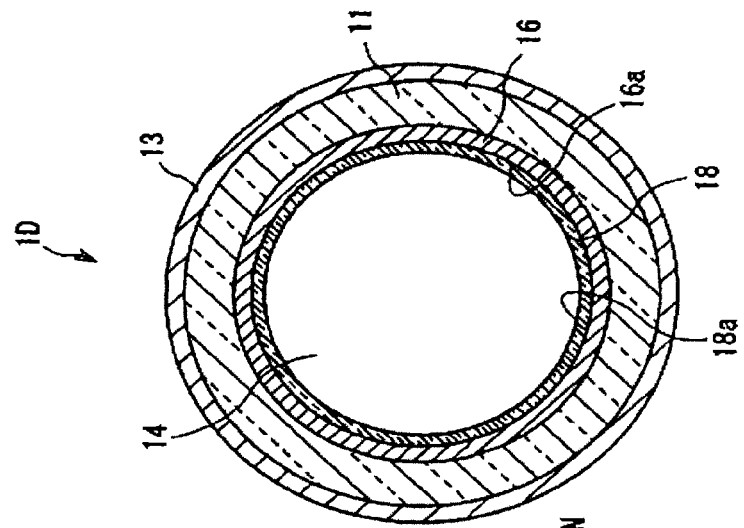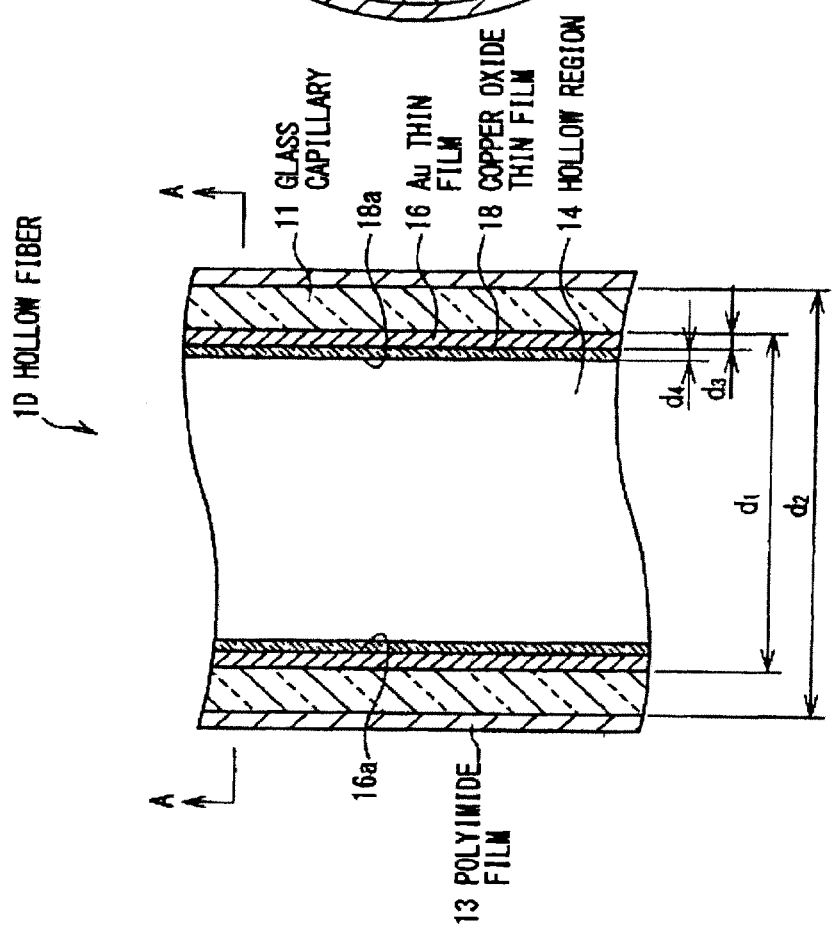

HOLLOW FIBER FORMED USING METAL NANO PARTICLES

The present application is a Divisional of U.S. application Ser. No. 12/389,005, filed Feb. 19, 2009 which is based on Japanese Patent Application No. 2008-039303 filed on Feb. 20, 2008 and Japanese Patent Application No. 2008-044296 filed on Feb. 26, 2008, the entire contents of which are incorporated herein by reference.

BACKGROUND OF THE INVENTION

1. Field of the Invention

The present invention relates to a hollow fiber and a method for fabricating the same, more particularly, to a hollow fiber provided with a reflecting layer with a substantially uniform film thickness along a longitudinal direction of the hollow fiber and a method for fabricating the same.

2. Related Art

As a conventional hollow waveguide, a hollow fiber with a hollow structure which comprises a quartz material has been known. The hollow fiber has been employed as an optical transmission line for a pulsed laser light having a high peak power or for a light in an infrared (IR) wavelength band of a wavelength of 2 μm or more that cannot be used for a solid (non-porous) type optical fiber comprising a quartz material as a transmission medium since an optical transmission loss is too large.

For increasing an optical transmission efficiency in such a hollow fiber, a hollow fiber in which an inside of the hollow structure is coated with a metal film is proposed. By way of example only, Satoshi Kubota et al, "Fabrication of low loss narrow silver hollow glass waveguide by silver mirror reaction method", Laser Engineering, The Laser Society of Japan, June 1997, Vol. 25, p 438-441 discloses the silver hollow glass waveguide.

In the hollow fiber disclosed by Kubota et al, a silver liquid made by dissolving silver nitrate and a reducing liquid containing glucose as a reducing agent are simultaneously vacuumed with a vacuum pump to be mixed with each other, and the mixed liquid is introduced into a glass capillary that is a base material of the hollow fiber, so that silver particles are deposited on an inner wall to provide a silver thin film.

Further, there is another type of a conventional hollow fiber, in which a thin film of aluminum is formed on an inner wall of a glass capillary by MOCVD (Metal Organic Chemical Vapor Deposition) method with the use of DMEAA (dimethylethylaminealane) as a source. By way of example only, Yuji Matsuura et al "Aluminum-coated hollow fiber for excimer laser", Optical alliance, Japan Industrial Publishing Co., Ltd., July 1999, p 20-22 discloses an example of this type of the conventional hollow fiber.

However, according to the aforementioned conventional hollow fibers, there is a disadvantage in that a breakdown threshold of the hollow fiber is reduced when a laser light having an extreme high peak power of the pulsed laser light, since a stress loading based on irradiation of the laser light may become considerable in accordance with a metal particle diameter composing the metal film formed on the inner wall.

As a still another conventional hollow fiber, a hollow fiber comprising a glass capillary with a hollow structure, a silver thin film coated on an inner wall of the glass capillary, and an silver iodide thin film formed at a surface of the silver thin film is proposed. By way of example only, J. Harrington, "A Review of IR Transmitting, Hollow Waveguides", Fiber and Integrated Optics, Vol. 19, pp. 211-227 (2000) discloses an example of this type of the conventional hollow fiber.

In the hollow fiber disclosed by Harrington, a silver liquid made by dissolving silver nitrate and a reducing liquid containing glucose as a reducing agent are simultaneously vacuumed with a vacuum pump to be mixed with each other, and the mixed liquid is introduced into a glass capillary that is a base material of the hollow fiber, so that silver particles are deposited on an inner wall to provide a silver thin film, similarly to the conventional hollow fiber disclosed by Kubota et al. (Silver mirror plating method). Subsequently, a solution in which iodine is dissolved is poured into the glass capillary to change a part of the silver thin film into a silver iodide by chemical reaction.

Since the hollow fiber disclosed by Harrington has a hollow structure, this type of the hollow fiber may be used the optical transmission line for the pulsed laser light having the high peak power or for the light in the IR wavelength band of a wavelength of 2 μm or more that cannot be used for the solid type optical fiber comprising a quartz material as the transmission medium because of the optical transmission loss. In addition, since the hollow fiber disclosed by Harrington is provided with the silver thin film and a transparent layer at the inner wall of the capillary, it is possible to reduce the transmission loss of the light in an IR region.

However, in the hollow fiber disclosed by Harrington, the silver thin film has a film thickness distribution in a longitudinal direction of the hollow fiber, since the silver thin film is formed by silver mirror electroplating method. In addition, the silver thin film formed at the inner wall of the glass capillary should be a film with a thickness of several micrometers (μm), since the silver iodide thin film is formed by carrying out an iodine process on a part of the silver thin film. Therefore, a mirror surface of the inner wall of the glass capillary cannot be succeeded to a surface of the silver iodide thin film in the hollow fiber disclosed by Harrington. Further, the film thickness of the silver iodide thin film is controlled by a contact time of the silver thin film with the solution in which the iodine is dissolved, so that a reaction rate varies in accordance with a variation in an iodine concentration and variation in solution temperature of the solution in which the iodine is dissolved, it is difficult to provide the silver iodide thin film with a smooth surface and a uniform film thickness along the longitudinal direction of the hollow fiber.

SUMMARY OF THE INVENTION

Accordingly, it is an object of the present invention to provide a hollow fiber and a method for fabricating the same, in which a breakdown threshold for high power laser light transmission is improved, and which is superior in stability, mechanical strength for a long term, and production yield.

It is another object of the present invention to provide a hollow fiber and a method for fabricating the same, in which a surface roughness of a transparent thin film is small and the transparent thin film has a substantially uniform thickness along the longitudinal direction of the hollow fiber.

According to a first feature of the invention, a hollow fiber comprises:

a hollow tube; and a reflecting film formed on an inner wall of the hollow tube, the reflecting film comprising a metal film formed by baking a metal nano particle.

In the hollow fiber, the metal nano particle before baking may have an average particle diameter of 10 nm or less. The reflecting film may comprise a dielectric film at an inner wall of the metal film, and the dielectric film is transparent with respect to a wavelength of a light to be propagated through a hollow region of the hollow tube.

According to a second feature of the invention, a method for fabricating a hollow fiber comprises:
- injecting a solution comprising a metal nano particle dispersed in a solvent into a hollow tube;
- coating the solution on an inner wall of the hollow tube;
- discharging an excess of the solution from the hollow tube;
- drying the solution coated on the inner wall of the hollow tube; and
- baking the dried solution by carrying out a heat treatment on the hollow tube provided with the dried solution at the inner wall to form a metal film at the inner wall of the hollow tube.

In the method for fabricating a hollow fiber, it is preferable that a content of the metal nano particle in the solution is 40 wt % or less and a viscosity of the solution is 100 mPa·s or less. The solvent may comprises toluene, hexane, or tetradecane. It is preferable that the heat treatment is carried out at a temperature of 150 to 350° C. while flowing a gas within the hollow tube. The metal film may be formed with controlling at least one of a content of the metal nano particle in the solution, a viscosity of the solution, and a flow rate of the solution. The solution may be injected into the hollow tube by injection with pressurization of the solution or vacuuming with depressurization of the solution.

According to a third feature of the invention, a hollow fiber comprises:
- a hollow tube having a hollow region for transmitting a light;
  - a first metal thin film formed on an inner wall of the hollow tube, the first metal thin film having a chemical stability; and
  - a transparent thin film comprising a material chemically changed from a second metal thin film formed by baking a metal nano particle provided on an opposite surface of the first metal thin film with respect to a surface contacting to the inner wall, the transparent thin film being transparent with respect to a wavelength of the light.

In the hollow fiber, the metal nano particle may comprise a silver nano particle, and the transparent film may comprise a silver iodide formed by iodizing a silver thin film formed by baking the silver nano particle. Alternatively, the metal nano particle may comprise a copper nano particle, and the transparent film may comprise a copper oxide formed by oxidizing a copper thin film formed by baking the copper nano particle.

According to a fourth feature of the invention, a method for fabricating a hollow fiber comprises:
- injecting a first nano particle solution comprising a first metal nano particle dispersed in a first solvent into a hollow tube comprising a hollow region for transmitting a light;
- coating the first nano particle solution on an inner wall of the hollow tube;
- forming a first metal thin film having a chemical stability from the first nano particle solution coated on the inner wall;
- injecting a second nano particle solution comprising a second metal nano particle dispersed in a second solvent into the hollow tube;
- coating the second nano particle solution on a surface of the first metal thin film;
- forming a second metal thin film on a surface of the first metal thin film from the second nano particle solution coated on the surface of the first metal thin film; and
- injecting a transparent film formation material which chemically reacts with the second metal thin film to form a transparent thin film that is transparent with respect to a wavelength of the light, thereby forming the transparent thin film on the first metal thin film from the second nano particle solution.

In the method for fabricating a hollow fiber, the second nano metal particle may comprise a silver nano particle, the second thin metal film may comprise a silver thin film formed from the silver nano particle, the transparent film formation material may comprise an iodine solution containing an iodine, and an silver iodide thin film may be formed as the transparent thin film by contacting the iodine solution with the silver thin film. Alternatively, the second nano metal particle may comprise a copper nano particle, the second thin metal film may comprise a copper thin film formed from the copper nano particle, the transparent film formation material may comprise an oxygen, and a copper oxide thin film may be formed as the transparent thin film by contacting the oxygen with the copper thin film for a predetermined time.

According to a fifth feature of the invention, a method for fabricating a hollow fiber comprises:
- injecting a first nano particle solution comprising a first metal nano particle dispersed in a first solvent into a hollow tube comprising a hollow region for transmitting a light;
- coating the first nano particle solution on an inner wall of the hollow tube;
- forming a first metal thin film having a chemical stability from the first nano particle solution coated on the inner wall;
- injecting a second nano particle solution comprising a second metal nano particle dispersed in a second solvent into the hollow tube;
- coating the second nano particle solution on a surface of the first metal thin film; and
- flowing a gas including an oxygen into the hollow tube, thereby forming a transparent thin film that is transparent with respect to a wavelength of the light on the first metal thin film from the second nano particle solution.

Advantages of the Invention

According to the present invention, it is possible to provide a hollow fiber and a method for fabricating the same, in which the breakdown threshold is improved, and which is superior in stability, mechanical strength, and production yield for a long term.

Further, according to the present invention, it is possible to provide a hollow fiber and a method for fabricating the same, in which a surface roughness of a surface of a transparent thin film is small and the transparent thin film has a substantially uniform thickness along the longitudinal direction of the hollow fiber.

BRIEF DESCRIPTION OF THE SCHEMATIC DIAGRAMS

Next, the preferred embodiment according to the invention will be explained in conjunction with appended schematic diagrams, wherein:

FIG. 1 is a cross sectional view of a hollow fiber in a first preferred embodiment according to the present invention;

FIGS. 2A to 2D are schematic diagrams showing a process for fabricating the hollow fiber in the first preferred embodiment according to the present invention;

FIGS. 7A and 7B are explanatory diagrams showing a hollow fiber in a sixth preferred embodiment, wherein FIG. 7A is a partial longitudinal sectional view of the hollow fiber, and FIG. 7B is a cross sectional view of the hollow fiber along A-A line;

FIGS. 8A to 8C are schematic diagrams showing a process for fabricating the hollow fiber in the sixth preferred embodiment;

FIGS. 9A and 9B are schematic diagrams showing a process for fabricating the hollow fiber in the sixth preferred embodiment;

FIGS. 12A to 12C are schematic diagrams showing the process for fabricating the hollow fiber in the six preferred embodiment;

FIGS. 13A and 13B are schematic diagrams showing the process for fabricating the hollow fiber in the six preferred embodiment; and FIGS. 14A and 14B are explanatory diagrams showing a hollow fiber in a seventh preferred embodiment, wherein FIG. 14A is a partial longitudinal sectional view of the hollow fiber, and FIG. 14B is a cross sectional view of the hollow fiber along A-A line.

DETAILED DESCRIPTION OF THE PREFERRED EMBODIMENTS

Figure 3:
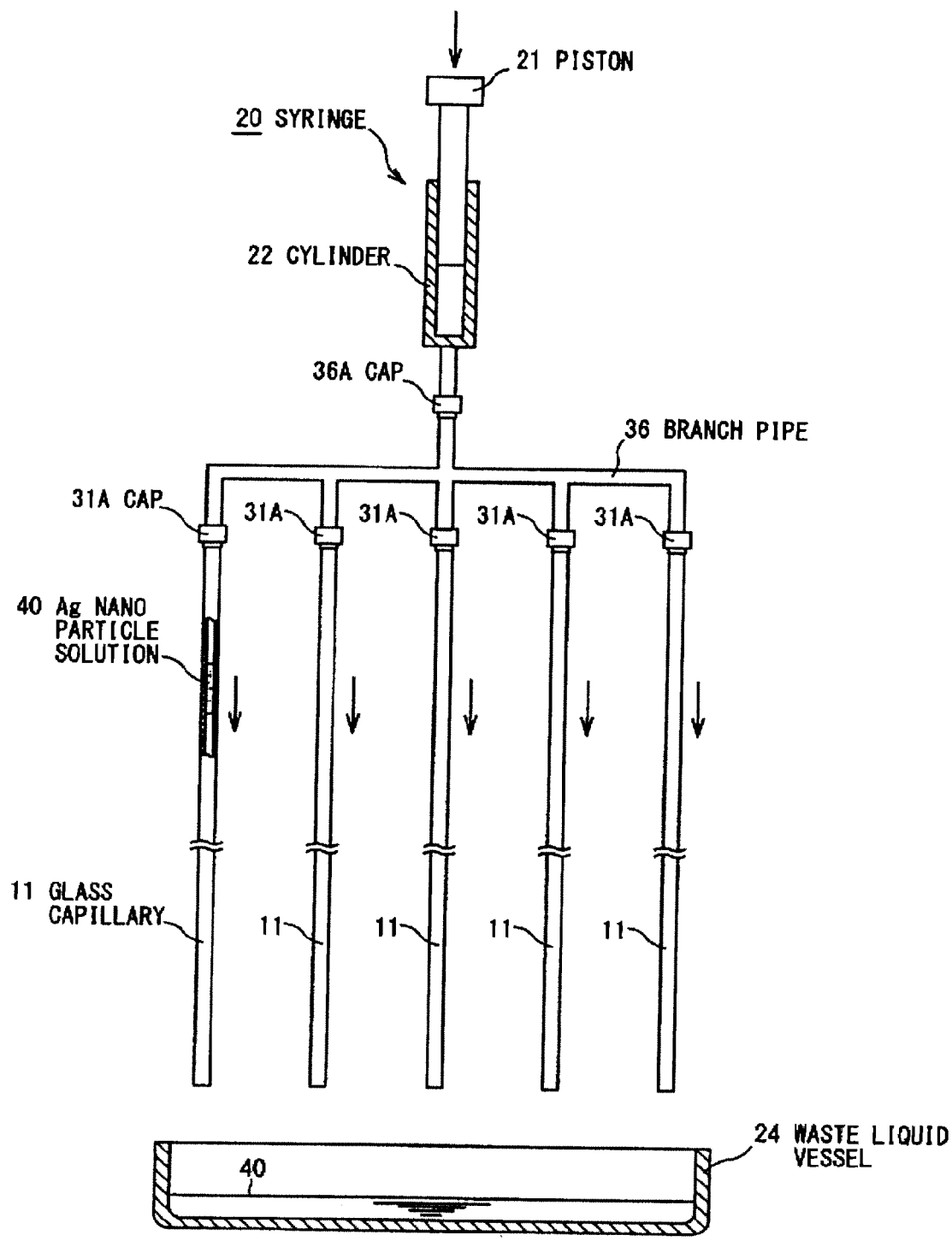
FIG. 3 is a schematic diagram showing a fabrication apparatus of a hollow fiber in a second preferred embodiment according to the present invention.

Next, preferred embodiments of the present invention will be explained in more detail in conjunction with appended drawings.

(First Preferred Embodiment)

FIG. 1 is a cross sectional view of a hollow fiber in a first preferred embodiment according to the present invention.

A hollow fiber 1 comprises a hollow shaped glass capillary 11 comprising a quartz (silica), a silver (Ag) thin film 12 as a reflecting film formed by baking silver (Ag) nano particles inside the hollow-shaped glass capillary 11, and a polyimide film 13 coated to cover an outer periphery surface of the glass capillary 11. This hollow fiber 1 is configured to propagate a light in a hollow region 14 provided at an inner surface of the Ag thin film 12.

The glass capillary 11 is formed to have an inner wall with a smooth surface, and is superior in optical characteristics and heat resistance. In the first preferred embodiment, a quartz glass capillary having an inner diameter of 500 μm and an outer diameter of 650 μm is used, and this quartz glass capillary is also superior in flexibility.

It is preferable that the Ag thin film 12 has an average particle diameter of the Ag nano particles before baking is not greater than 10 nm. Herein, the "nano particle" means a superfine particle with a diameter in nanometer order. In the first preferred embodiment, the Ag nano particles each having a particle diameter from 3 to 5 nm is used for forming the Ag thin film 12. Technology for manufacturing the metal nano particle with such a particle diameter has been already established for nano particles of Ag, Au, and Cu. In addition, it is preferable that a film thickness of the Ag thin film 12 is greater than an optical skin depth in a wavelength band of the light to be propagated through the hollow fiber 1 and not greater than 100 nm. In the first preferred embodiment, the film thickness of the Ag thin film 12 is about 50 nm.

The polyimide film 13 is provided as a protective layer to cover an outer periphery surface of the glass capillary 11. This polyimide film 13 is exposed to a high temperature atmosphere in a baking process for forming the Ag thin film 12, and the polyimide film 13 has a heat resistance enough for this baking temperature.

FIGS. 2A to 2D are schematic diagrams showing a process for fabricating the hollow fiber in the first preferred embodiment according to the present invention. Herein, in FIGS. 2A to 2D, partial longitudinal sectional views of a syringe 20 and the glass capillary 11 are shown to facilitate the explanation of the invention.

Next, referring to FIG. 1 and FIGS. 2A to 2D, a process for fabricating the hollow fiber 1 will be explained.

At first, as shown in FIG. 2A, a cap 31A provided at an upper part of the glass capillary 11 is attached to a tip portion of the syringe 20 having a piston 21. This syringe 20 comprises a cylindrical piston 21 and a cylindrical main body (cylinder) 22 to compose a syringe pump for precisely driving the piston 21. In the cylinder 22, a predetermined volume of Ag nano particle solution 40 in that the Ag nano particles are dispersed in a hexane as a solvent. In the first preferred embodiment, the Ag nano particle solution 40 with a content of 35 w % of Ag and a viscosity from 10 to 50 mPa·s is used.

As shown in FIG. 2B, the piston 21 of the syringe 20 is driven in a pushing direction at a constant rate. The Ag nano particle solution 40 is drained at a constant rate from cylinder 22 in accordance with a pushing drive of the piston 21, and injected by pressurization into the inside of the glass capillary 11.

In the glass capillary 11, the Ag nano particle solution 40 injected to the inside of the glass capillary 11 is attached to the inner wall as Ag nano particle solution 40 moves downwardly. Then, an excess of the Ag nano particle solution 40 is discharged from a lower end of the glass capillary 11 to a waste liquid vessel 24 as shown in FIG. 2C. An amount of the Ag nano particle solution 40 coated on the inner wall of the glass capillary 11 depends upon the viscosity of the Ag nano particle solution 40 and a flow rate of the Ag nano particle solution 40 in the capillary.

Next, as shown in FIG. 2D, the glass capillary 11, in which the Ag nano particle solution 40 is coated on the inner wall, is accommodated in an electric furnace 25. A high-temperature heat treatment is carried out on the glass capillary 11 while passing a nitrogen ($N_2$) gas 60, so as to dry the Ag nano particle solution 40. After the Ag nano particle solution 40 is dehumidified, a further heat treatment is carried out for baking.

In the first preferred embodiment, the heat treatment temperature for baking the Ag nano particle solution 40 is from 150 to 350° C. If the heat treatment temperature is lower than 150° C., a density of the Ag thin film 12 after baking is low, so that it is impossible to provide sufficient optical characteristics, mechanical strength and adhesive force. In addition, it is observed that the Ag nano particles is aggregated so that the particle diameter is increased when the heat treatment temperature is higher than 350° C.

The Ag thin film 12 is formed at the inner wall of the glass capillary 11 by this high-temperature heat treatment. The film thickness of the Ag thin film 12 after baking depends upon the content of Ag. When the content is greater than 40 wt %, or the viscosity of the Ag nano particle solution 40 is greater than 100 mPa·s, the uniformity of the Ag thin film 12 falls, so that it is difficult to realize a desired film thickness with high precision. Further, the polyimide film 13 previously coated on the outer periphery surface of the glass capillary 11 as the protective layer can bear enough the heat within the temperature range from 150 to 350° C.

(Effect of the First Preferred Embodiment)

According to the hollow fiber in the first preferred embodiment, since the Ag nano particle solution 40 containing the Ag nano particles dispersed in the solvent is coated on the inner wall of the glass capillary, and the high-temperature heat treatment is carried out thereon to form the Ag film by baking, it is possible to reduce a difference in roughness of the Ag particles at a surface contacting to an air and at a surface contacting to the inner wall of the glass capillary without using a large-scaled equipment, thereby providing the Ag film comprising the Ag particles in nanometer order with the uniform film thickness. According to this structure, the optical characteristics in the laser light transmission with a high peak power are stabilized, the optical transmission efficiency is enhanced, and the mechanical strength characteristic depending on the particle diameter of the Ag particles composing the Ag thin film is improved.

Further, it is possible to fabricate the hollow fiber, in which the breakdown threshold for high power laser light transmission is remarkably high, and which is excellent in the long term stability and the mechanical strength with respect to the laser light having an extremely high peak power spatially or temporally, such as a high power and short pulsed laser light, with a high production yield, while suppressing the increase in the fabrication cost compared with a conventional method for fabricating the hollow fiber. Therefore, the present invention is advantageously applicable to the various fields, such as medical treatment, industrial work, measurement, analysis, and chemistry.

In the first preferred embodiment, a structure of the hollow fiber using the Ag nano particle having the particle diameter of 3 to 5 nm is explained. By using the metal nano particles having the aforementioned particle diameter range, it is possible to provide the metal film with the uniform film thickness and a shiny surface.

In the method for fabricating a hollow fiber as shown in FIGS. 2A to 2D, the amount of the Ag nano particle solution 40 coated on the inner wall of the glass capillary 11 is very small, and the discharged Ag nano particle solution 40 may be collected into the waste liquid vessel 24 and injected again. Therefore, a utilization efficiency of the Ag nano particle solution 40 is remarkably high. Accordingly, even though an expensive material such as Au and Ag is used, it is possible to suppress the increase in the fabrication cost.

In the first preferred embodiment, the glass capillary 11 comprising the quartz is used as the base material of the hollow fiber, however, the present invention is not limited thereto. Other hollow tubes such as polymer resin tube, stainless pipe may be used. Although the polymer resin tube has the heat resistance inferior to that of the quartz glass capillary 11, the polymer resin is superior in the flexibility, and is not fragile against an impact, so that a risk of breakage of the hollow fiber using the polymer resin tube is small. The hollow fiber using the stainless is inferior in the flexibility. However, this hollow fiber is rigid and strong against an impact, so that a risk of breakage of the hollow fiber using the stainless is small. In addition, the hollow fiber using the stainless is suitable for the high power laser light transmission, since this hollow fiber is superior in the thermal conductivity.

Further, in the first preferred embodiment, the nitrogen gas is used as a passing gas during the high-temperature heat treatment carried out on the glass capillary 11, however, the present invention is not limited thereto. Various gases such as air, argon gas, and helium gas may be used.

In addition, as a metal material to be formed at the inner wall of the glass capillary 11 is Ag in the first preferred embodiment, however, the present invention is not limited thereto. Cu and Au may be also used. The metal thin film formed by using these materials is excellent in the optical characteristics, since each of Ag, Cu, and Au has a high reflectivity. Although Au is an expensive material, Au is chemically stable without corrosion and discoloration thus superior in the stability.

As the solvent for dispersing the Ag nano particles in the first preferred embodiment, the hexane that provides a rapid evaporation of the Ag nano particle solution 40 coated on the inner wall surface of the glass capillary 11 is used, however, the present invention is not limited thereto. Various solvent such as toluene and tetradecane may be used.

Still further, the film thickness of the Ag thin film 12 is not greater than 100 nm in the first preferred embodiment. It was confirmed that the particle diameter of the Ag thin film 12 is increased, that a mechanical stress loading to the glass capillary 11 is not negligible, and that the mechanical strength of the hollow fiber 1 is deteriorated, when the film thickness of the Ag thin film 12 is greater than 100 nm. Since the Ag thin film 12 is a lossy medium, an optical energy will not be penetrated into the Ag thin film 12 deeply. Therefore, the effect of forming the Ag thin film 12 is demonstrated by increasing the thickness of the Ag thin film 12 to be greater than an optical skin depth. Herein, the "optical skin depth" means a film thickness d in which the optical energy is attenuated to $\exp(-1)$, and the optical skin depth is expressed as $d=\lambda/(4\pi k)$, wherein $\lambda$ is a wavelength of the light propagated through the hollow region 14, and k is an extinction coefficient of the material.

By way of example only, the extinction coefficient of Ag is 75 and the skin depth of Ag is around 11 nm, in a wavelength of 10.6 μm which is a wavelength of $CO_2$ laser light. In the first preferred embodiment, the film thickness of the Ag thin film 12 is around 50 nm. This thickness is sufficiently greater than the skin depth and does not affect on the mechanical strength.

(Second Preferred Embodiment)

FIG. 3 is a schematic diagram showing a fabrication apparatus of a hollow fiber in a second preferred embodiment according to the present invention.

In FIG. 3, partial longitudinal sectional views of the syringe 20 and the glass capillary 11 are shown to facilitate the explanation of the invention. Further, in following explanation, similar reference numerals are assigned to parts having structure and function similar to those in the first preferred embodiment.

The fabrication apparatus of the hollow fiber in the second preferred embodiment is configured to provide a branch pipe 36 for injecting the Ag nano particle solution 40 into plural glass capillaries 11 between the syringe 20 and the glass capillary 11 in the first preferred embodiment.

The branch pipe 36 is such configured that the syringe 20 is connected to a cap 36A at an inlet end thereof and connected to a cap 31A of each of the glass capillaries 11 at each of outlet ends thereof, and that the nano particle solution 40 is simultaneously injected from the single syringe 20 to a plurality of the glass capillaries 11.

(Effect of the Second Preferred Embodiment)

According to the second preferred embodiment, it is possible to inject the Ag nano particle solution 40 simultaneously into a plurality of the glass capillaries 11, thereby improving the production yield of the hollow fiber 1.

(Third Preferred Embodiment)

Figure 4:
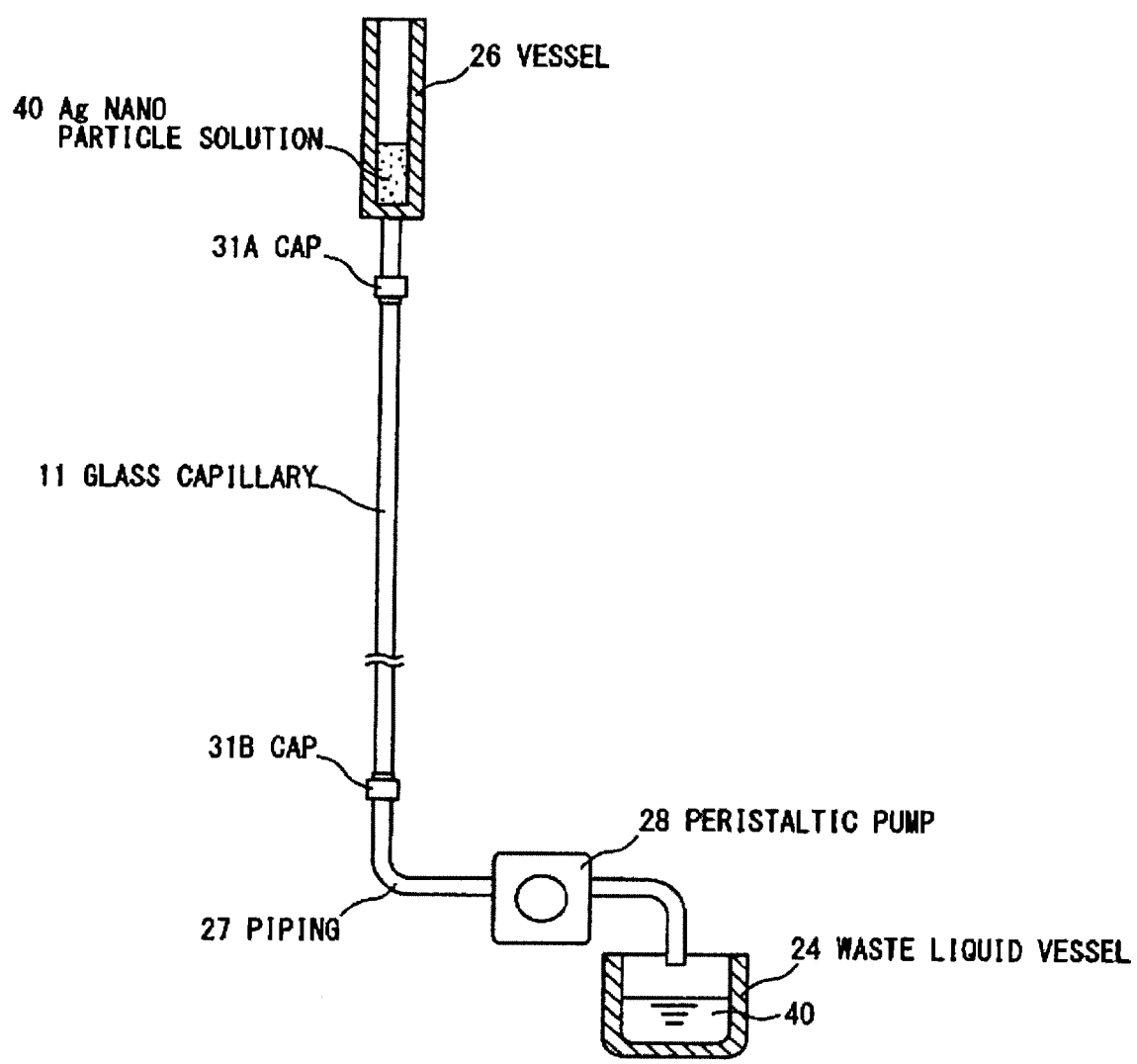
FIG. 4 is a schematic diagram showing a fabrication apparatus of a hollow fiber in a third preferred embodiment according to the present invention.

FIG. 4 is a schematic diagram showing a fabrication apparatus of a hollow fiber in a third preferred embodiment according to the present invention.

In FIG. 4, partial longitudinal sectional views of a vessel 26 and the waste liquid vessel 24 are shown to facilitate the explanation of the invention.

The fabrication apparatus of a hollow fiber in the third preferred embodiment is such configured that a tubular vessel 26 accommodating the Ag nano particle solution 40 is connected to a cap 31A at an inlet end (upper side) of the glass capillary 11, and that a piping 27 having an elasticity is connected to a cap 31B at an outlet end (lower side).

The piping 27 is provided with a peristaltic pump 28, and a terminal of the piping 27 provided at a downstream side with respect to the peristaltic pump 28 is located to be inside of the waste liquid vessel 24.

The peristaltic pump 28 applies an external force to the piping 27 with a roller or the like to contract the piping 27 in wavy shape, thereby transmitting the Ag nano particle solution 40. In FIG. 4, the peristaltic pump 28 is connected to a downstream side of the glass capillary 11, and the Ag nano particle solution 40 is suctioned by depressurization from the vessel 26 into the glass capillary 11 by depressurizing the inside of the glass capillary 11 and the piping 27.

(Effect of the Third Preferred Embodiment)

According to the third preferred embodiment, it is possible to uniformly coat the Ag nano particle solution 40 on the inner wall of the glass capillary 11 similarly to the pressurized injection of the Ag nano particle solution 40, by suctioning the Ag nano particle solution 40 from the vessel 26 by depressurizing the inside of the piping 27 and the glass capillary 11 with the use of the peristaltic pump 28.

(Fourth Preferred Embodiment)

Figure 5:
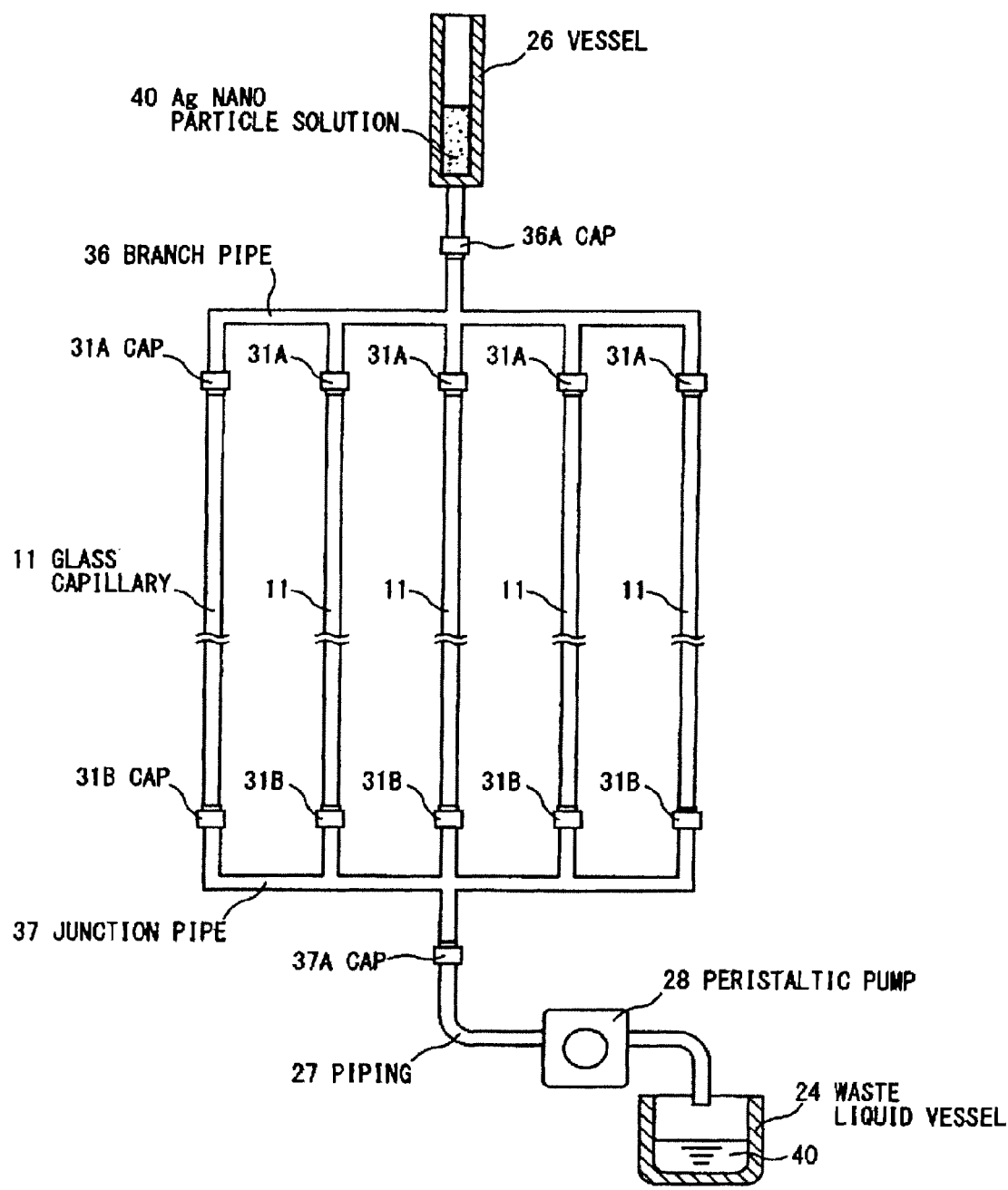
FIG. 5 is a schematic diagram showing a fabrication apparatus of a hollow fiber in a fourth preferred embodiment according to the present invention.

FIG. 5 is a schematic diagram showing a fabrication apparatus of a hollow fiber in a fourth preferred embodiment according to the present invention.

In FIG. 5, partial longitudinal sectional views of the vessel 26 and the waste liquid vessel 24 are shown to facilitate the explanation of the invention.

The fabrication apparatus of a hollow fiber in the fourth preferred embodiment is similar to the second preferred embodiment in the structure of the inlet end (upper side) of the glass capillary 11. The fourth preferred embodiment is different from the second preferred embodiment in that a junction pipe 37 is provided at an outlet end (lower side) of each of the glass capillaries 11 via a cap 31B. This junction pipe 37 is configured to converge the Ag nano particle solution 40 drained from each of the glass capillaries 11, thereby leading the Ag nano particle solution 40 to the piping 27. The structure from the piping 27 to the waste liquid vessel 24 is similar to the third preferred embodiment.

(Effect of the Fourth Preferred Embodiment)

According to the fourth preferred embodiment, it is possible to improve the adhesive property of the Ag nano particle solution 40 to the inner wall of each of the glass capillaries 11 and to improve a collection efficiency of the Ag nano particle solution 40 discharged to the waste liquid vessel 24, in addition to the advantageous effects of the second and third preferred embodiments.

(Fifth Preferred Embodiment)

Figure 6:
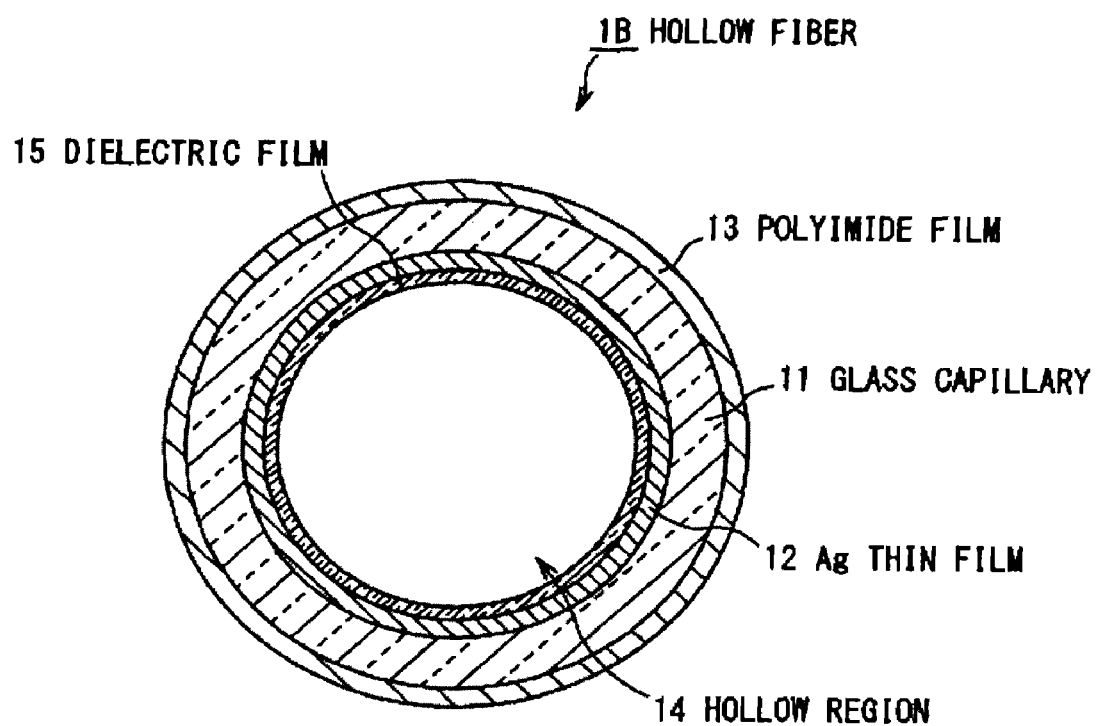
FIG. 6 is a cross sectional view of a hollow fiber in a fifth preferred embodiment according to the present invention.

FIG. 6 is a cross sectional view of a hollow fiber in a fifth preferred embodiment according to the present invention.

A hollow fiber 1B further comprises a dielectric film 15 at an inside of the Ag thin film 12 of the hollow fiber 1A explained in the first preferred embodiment, and the dielectric film comprises a dielectric material which is transparent with respect to a wavelength band of a light to be propagated through a hollow region 14. In the fifth preferred embodiment, the dielectric film 15 comprising an olefin resin is provided for the purpose of transmission of Er-YAG laser light, $CO_2$ laser light, or the like.

(Effect of the Fifth Preferred Embodiment)

According to the fifth preferred embodiment, it is possible to reduce the transmission loss, by further forming the dielectric film 15 which is transparent with respect to a wavelength band of the light to be propagated through the hollow region 14, at the inside of the Ag thin film 12 of the hollow fiber 1A in the first preferred embodiment. In particular, this effect is remarkable in the IR wavelength region, and advantageous for the transmission of the laser light such as the Er-YAG laser light, the $CO_2$ laser light or the like.

Further, in the hollow fiber 1B provided with the dielectric film 15, the breakdown threshold is improved and the stable characteristics can be obtained, even tough the hollow fiber 1B is used together with the Er-YAG laser, the $CO_2$ laser, or the like, which is effective for the transmission of the light with higher peak power.

In the hollow fiber 1B according to the fifth preferred embodiment, the olefin resin is used as a material of the dielectric film 15. However, the present invention is not limited thereto. A polyimide resin may be used as a material of the dielectric film 15 for the transmission of Nd-YAG laser light with a wavelength shorter than that of the Er-YAG laser, the $CO_2$ laser, or the like.

(Sixth preferred embodiment)

FIGS. 7A and 7B are explanatory diagrams showing a hollow fiber in a sixth preferred embodiment, wherein FIG. 7A is a partial longitudinal sectional view of the hollow fiber, and FIG. 7B is a cross sectional view of the hollow fiber along A-A line.

(Structure of a Hollow Fiber 1C)

As shown in FIGS. 7A and 7B, a hollow fiber 1C in the sixth preferred embodiment comprises a glass capillary 11 having a predetermined length as a hollow tube, a gold (Au) thin film 12 provided to cover an inner wall with a mirror surface of the glass capillary 11 as a metal thin film serving as a reflecting layer for reflecting back a light propagated through a hollow region 14, a silver iodide thin film 17 formed as a transparent thin film by chemical reaction at an opposite surface of the Au thin film 16 with respect to a surface contacting to an inner wall of the glass capillary 11, and a polyimide film 13 for coating an outer surface of the glass capillary 11.

The glass capillary 11 as a base material of the hollow fiber 1C has a cylindrical structure and includes the hollow region 14 through which a light with a predetermined wavelength is propagated. The hollow region 14 is a region filled with gas such as air.

The material of the capillary is not limited to the glass in the present invention. The capillary comprises a material having an inner wall that is sufficiently smooth with respect to the wavelength of the light propagated through the hollow region 14, and that is superior in the optical characteristics and has the heat resistance. For example, as the capillary, the quartz glass capillary comprising the quartz glass, the polymer resin tube comprising a polymer as a high polymer material, or the stainless steel pipe comprising the stainless steel as the metal material may be used.

More concretely, in this preferred embodiment, a narrow diameter capillary of the quartz glass with an inner diameter d1 of 500 µm and an outer diameter d2 of 650 µm, which is excellent in the flexibility, as the glass capillary 11. When it is required to use a capillary that is superior in the flexibility and hard to be damaged as the capillary, the polymer resin tube may be used. When, it is required to use a capillary that has enough strength against an impact as well as an excellent thermal conductivity required for the transmission of the high-power laser light and that is hard to be damaged as the capillary, the stainless steel pipe may be used.

The metal thin film provided at the inner wall of the glass capillary 11 comprises a material that has an excellent chemical stability in which the corrosion and/or the discoloration does not substantially occur as well as the stability in the characteristics. More concretely, the metal thin film in this preferred embodiment is the Au thin film 16 as a first metal thin film formed by baking a gold (Au) nano particle as a first metal nano particle at the inner wall of the glass capillary 11 using the Au nano particles as a source. As an example, the Au thin film 16 is formed to have a film thickness d3 that is sufficiently greater than the optical skin depth and not greater than dozens of nanometers (nm) by baking the Au nano particles having a predetermined average particle diameter.

As long as the metal nano particle demonstrates the excellent optical characteristics (e.g. high reflectivity) with respect to the wavelength of the light to be propagated through the hollow region 14 and is superior in the chemical stability, the metal nano particle for forming the metal thin film is not limited to the Au nano particle. Herein, as for the Au nano particle before baking, the Au nano particle with the average particle diameter of 10 nm or less is used. By way of example only, the Au thin film 16 may be formed by using the Au nano particle having the average particle diameter from 3 nm to 5 nm.

The silver iodide thin film 17 as a transparent thin film formed to be transparent with respect to a predetermined wavelength is formed by chemically changing a silver (Ag) thin film as a second metal thin film formed by using a silver (Ag) nano particle as a second metal nano particle which is different from the Au nano particle as a source. More concretely, the silver iodide thin film 17 is formed by chemically changing the silver thin film into the silver iodide thin film 17 by iodizing the silver thin film formed with a predetermined film thickness at a surface 16a of the Au thin film 16. The silver iodide thin film 17 serves as a transparent layer (dielectric material layer) that is transparent with respect to a light within a range from a visible light region to the IR light region.

Herein, the propagation light in the hollow fiber 1 is propagated through the hollow region 14 along the longitudinal direction of the hollow fiber 1, while repeating reflections at a boundary between the hollow region 14 and the silver iodide thin film 17 as the transparent thin film and a boundary between the silver iodide thin film 17 and the Au thin film 16. When the light reflected at the boundary between the hollow region 14 and the silver iodide thin film 17 and the light transmitted through the silver iodide thin film 17 and reflected at the boundary between the silver iodide thin film 17 and the Au thin film 16 have the same phase, the reflectivity of the hollow fiber inner wall becomes maximum. Therefore, it is possible to reduce the optical transmission loss, by providing the silver iodide thin film 17 having the uniform film thickness that is well controlled in accordance with the wavelength of the light to be transmitted through the inner wall of the Au thin film 16. In this preferred embodiment, the silver iodide thin film 17 is formed to have the film thickness d4 determined in accordance with the wavelength of the light to be transmitted through the hollow region 14 within a film thickness range that is not greater than dozens of nanometers (nm). In other words, the silver thin film and the silver iodide thin film 17 are formed to have a film thickness that is not greater than dozens of nanometers (nm) for example.

The polyimide film 13 as the protective film is formed to cover an outer periphery of the glass capillary 11. In this preferred embodiment, the protective film comprises the polyimide as a polymer resin material that is excellent in the thermal characteristics, the chemical characteristics and the mechanical characteristics.

(Process for Fabricating the Hollow Fiber 1C)

FIGS. 8A to 8C, 9A, 9B, 10A to 10C, 11A, 11B, 12A to 12C, 13A, and 13B are schematic diagrams showing a process for fabricating the hollow fiber in the sixth preferred embodiment.

At first, as shown in FIG. 8A, a syringe 20 having a dissolution resistance property against the organic solvent is attached to a second end part (another end part) 11B as an upper end of the glass capillary 11 comprising the quartz glass. Herein, the syringe 20 comprises a cylindrical piston 21 and a cylinder 22, to compose a syringe pump which drives the piston 21 with high accuracy. Thereafter, a predetermined volume of a gold (Au) nano particle solution 41 is accommodated in the cylinder 22.

Herein the Au nano particle solution 41 is a solution prepared by dispersing a predetermined amount of Au nano particles in the organic solvent as a predetermined solvent. In this preferred embodiment, the toluene may be used as an organic solvent having an excellent volatility for dispersing the Au nano particles. Alternatively, the Au nano particle solution 41 may be prepared by dispersing the Au nano particles in the organic solvent such as hexane, tetradecane, or an organic solvent such as terpineol.

Next, as shown in FIGS. 8B and 8C, the piston 21 of the syringe 20 is driven in a pushing direction (from the first end part 11B to a second end part 11A of the glass capillary 11) at a constant rate. The Au nano particle solution 41 is drained at a constant rate from the cylinder 22 in accordance with a pushing drive of the piston 21, and the drained Au nano particle solution 41 is injected into the inside of the glass capillary 11.

The Ag nano particle solution 40 injected to the inside of the glass capillary 11 is coated on the inner wall of the glass capillary 11 as the Au nano particle solution 41 moves from the first end part 11B to the first end part (a lower end) 11A of the glass capillary 11. Then, the Au nano particle solution 41 that is not coated on the inner wall of the glass capillary 11 i.e. an excess of the Au nano particle solution 41 is discharged from the second end part 11A of the glass capillary 11 to the outside of the glass capillary 11, and accommodated in a waste liquid vessel 24 as shown in FIG. 8C.

Next, as shown in FIG. 9A, the glass capillary 11, in which the Au nano particle solution 41 is coated on the inner wall, is accommodated in an electric furnace 25. A high-temperature heat treatment is carried out on the glass capillary 11 while introducing a nitrogen ($N_2$) gas 60 as an inert gas from the first end part 11B to the second end part 11A, thereby baking the Au nano particle solution 41. As a result, as shown in FIG. 9B (a cross sectional view of the glass capillary 11 along B-B line in FIG. 9A), the Au thin film 16 having a film thickness not greater than dozens of nanometers (nm) is formed at the inner wall of the glass capillary 11. Since the film thickness of the Au thin film 16 formed in this case is such a thickness that succeeds a shape of an inner wall surface of the glass capillary 11, a surface roughness of the surface 16a of the Au thin film 16 is in the same level as a surface roughness of the inner wall surface of the glass capillary 11.

In this preferred embodiment, the $N_2$ gas 60 is used as a gas to be introduced in the glass capillary 11, however, the present invention is not limited thereto. As an inert gas other than the $N_2$ gas 60, argon gas or helium may be used. Alternatively, the air may be introduced into the glass capillary 11, and the heat treatment may be carried out on the glass capillary 11 in which the Au nano particle solution 41 is coated on the inner wall.

In addition, the heat treatment is carried out at the temperature not lower than a temperature for forming the Au thin film 16 with a sufficiently high density, such that sufficient optical characteristics and mechanical strength are provided, and that the Au thin film 16 and the glass capillary 11 are bonded to each other with an enough adhesive force. Furthermore, the heat treatment is carried out at the temperature not higher than a temperature for avoiding formation of the Au thin film comprising the particle with a greater particle diameter than a predetermined value, due to the aggregation of the Au nano particles contained in the Au nano particle solution 41.

In the sixth preferred embodiment, for example, the heat treatment is carried out on the glass capillary 11 at a temperature from 200 to 300° C. while flowing the $N_2$ gas 60 in the glass capillary 11. In addition, even if the protective film is provided at the outer periphery of the glass capillary 11, when the protective film is the polyimide film 13, the polyimide does not change in quality due to thermal decomposition or the like, with in the temperature range of 200 to 300° C.

The Ag thin film 12 is formed similarly to the process for forming the Au thin film 16 shown in FIGS. 10A to 10C and 11A.

Figure 10A:
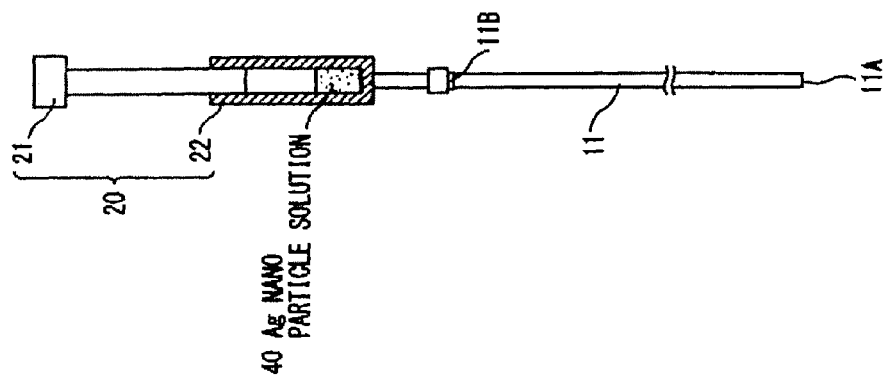
FIGS. 10A to 10C are schematic diagrams showing the process for fabricating the hollow fiber in the six preferred embodiment.

At first, as shown in FIG. 10A, the syringe 20 is attached to the first end part 11B of the glass capillary 11 in which the Au thin film 16 is formed at the inner wall. Thereafter, a predetermined volume of a silver (Ag) nano particle solution 40 as a second metal nano particle solution is accommodated in the cylinder 22. In the sixth preferred embodiment, the Ag nano particle solution 40 as the second metal nano particle solution is a solution prepared by dispersing a predetermined amount of Ag nano particles as second metal nano particles in the predetermined organic solvent. In this preferred embodiment, the toluene may be used as an organic solvent having an excellent volatility for dispersing the Ag nano particles. Alternatively, the Ag nano particle solution 40 may be prepared by dispersing the Ag nano particles in the organic solvent such as hexane, tetradecane.

Figure 10B:
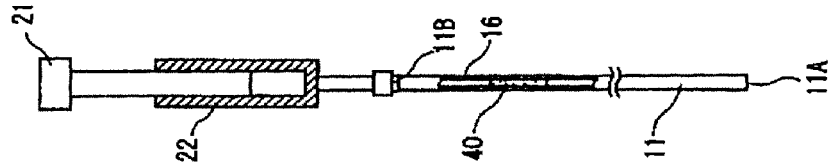
Figure 10C:
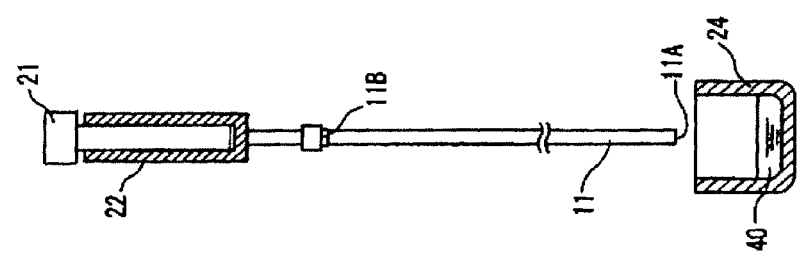

Next, as shown in FIGS. 10B and 10C, the piston 21 of the syringe 20 is driven in a pushing direction (from the first end part 11B to a second end part 11A of the glass capillary 11) at a constant rate. The Ag nano particle solution 40 is drained at a constant rate from the cylinder 22 in accordance with the pushing drive of the piston 21, and the drained Ag nano particle solution 40 is injected into the inside of the glass capillary 11. The Ag nano particle solution 40 injected to the inside of the glass capillary 11 is coated on the Au thin film 16 formed at the inner wall of the glass capillary 11 as the Ag nano particle solution 40 moves from the first end part 11B to the second end part 11A of the glass capillary 11. Then, the Ag nano particle solution 40 that is not coated on a surface of the Au thin film 16 i.e. an excess of the Ag nano particle solution 40 is discharged from the second end part 11A of the glass capillary 11 to outside of the glass capillary 11, and accommodated in the waste liquid vessel 24 as shown in FIG. 10C.

Figure 11A:
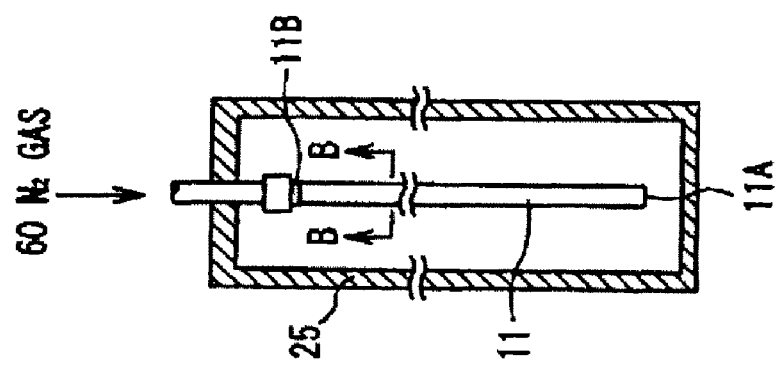
FIGS. 11A and 11B are schematic diagrams showing the process for fabricating the hollow fiber in the six preferred embodiment.

Successively, as shown in FIG. 11A, the glass capillary 11, in which the Ag nano particle solution 40 is coated on the Au thin film 16, is accommodated in the electric furnace 25. Herein, since the thickness of the Ag nano particle solution 40 coated on the surface of the Au thin film 16 in this case is such a thickness that succeeds a surface shape of the Au thin film 16, a surface roughness of a surface of the Ag nano solution 40 (an opposite surface of the Ag nano particle solution 40 with respect to a surface contacting the Au thin film 16) is as small as the surface roughness of the Au thin film 16.

Figure 11B:
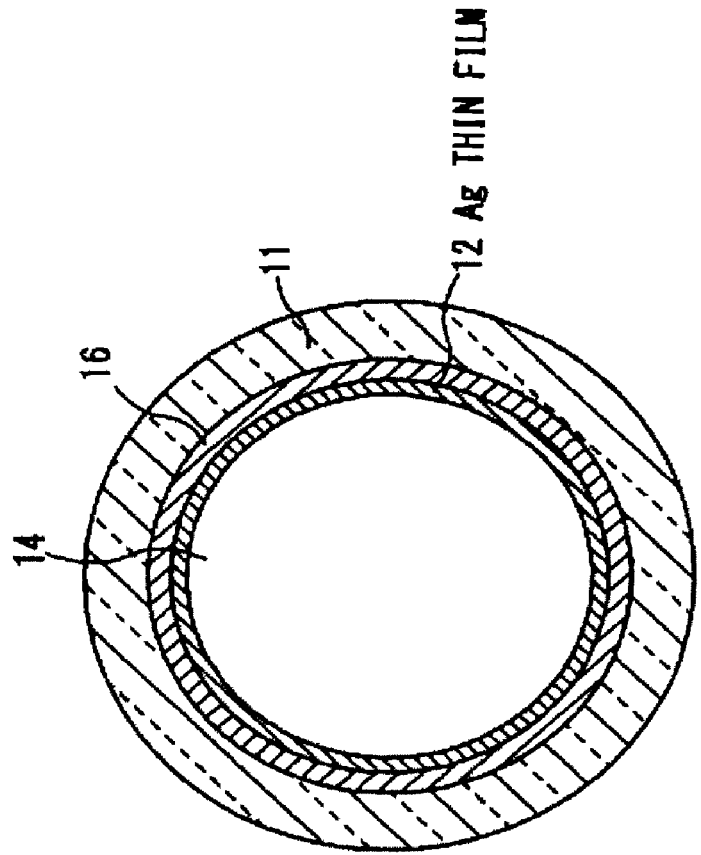

The high-temperature heat treatment is carried out on the glass capillary 11 while introducing a nitrogen ($N_2$) gas 60 from the first end part 11B to the second end part 11A, thereby baking the Ag nano particle solution 40. As a result, as shown in FIG. 11B (a cross sectional view of the glass capillary 11 along B-B line in FIG. 11A), the Ag thin film 12 is formed on the surface of the Au thin film 16. Since the film thickness of the Ag thin film 12 formed in this case is such a thickness that succeeds the surface shape of the Au thin film 16, the surface roughness of the surface of the Ag thin film 12 is in the same level as the surface roughness of the Au thin film 16.

In this preferred embodiment, the $N_2$ gas 60 is used as a gas to be introduced in the glass capillary 11, however, the present invention is not limited thereto. As an inert gas other than the $N_2$ gas 60, argon gas or helium may be used. Alternatively, the air may be introduced into the glass capillary 11, and heat treatment may be carried out on the glass capillary 11 in which the Ag nano particle solution 40 is coated on the Au thin film 16 provided on the inner wall.

Successively, as shown in FIG. 12A, the syringe 20 is again attached to the first end part 11B of the glass capillary 11 in which the Ag thin film 12 is formed. Thereafter, a predetermined volume of an iodine solution 42 as a transparent thin film formation material is accommodated in the cylinder 22. The iodine solution 42 in this preferred embodiment is a solution prepared by dissolving iodine in a concentration of about 1% in cyclohexane as an organic solvent.

Next, as shown in FIGS. 12B and 12C, the piston 21 of the syringe 20 is driven in a pushing direction at a constant rate. The iodine solution 42 is drained at a constant rate from the cylinder 22 in accordance with the pushing drive of the piston 21, and the drained iodine solution 42 is injected into the inside of the glass capillary 11. The iodine solution 42 injected to the inside of the glass capillary 11 contacts with the Ag thin film 12 for several seconds to several minutes, and discharged from the second end part 11A of the glass capillary 11 to outside of the glass capillary 11, and accommodated in the waste liquid vessel 24 as shown in FIG. 12C.

In this preferred embodiment, the iodine solution 42 poured into the glass capillary 11 chemically reacts with the Ag thin film 12. In other words, the silver composing Ag thin film 12 chemically combines with the iodine in the iodine solution 42. By this chemical combination, all of the Ag thin film 12 is changed into the silver iodide thin film 17. Herein, since the Ag thin film 12 is formed on the surface of the Au thin film 16, the chemical reaction of the silver with the iodine stops at the surface 16a of the Ag thin film 12 and the Au thin film 16. In other words, the Au thin film 16 serves as a reaction stopper layer for stopping the chemical reaction between the silver of the Ag thin film 12 and the iodine in the iodine solution 42 in this preferred embodiment. Therefore, in this preferred embodiment, if the contact time between the iodine solution 42 poured into the glass capillary 11 and the Ag thin film 12 is longer than a predetermined time, it is not necessary to strictly control the contact time of the iodine solution 42 with the Ag thin film 12.

Herein, the surface roughness of the Ag thin film 12 is in the same level as the surface roughness of the surface of the Au thin film 16, so that the surface roughness of the Ag thin film 12 is small enough compared with the wavelength of the light propagated through the hollow region 14. Similarly, the surface roughness of the surface 17a (a surface opposite to a surface contacting with the Au thin film 16, which contacts with the hollow region 14) of the silver iodine thin film 17 formed by chemically changing the Ag thin film 12 is small enough compared with the wavelength of the light propagated through the hollow region 14, similarly to the Ag thin film 12.

Successively, as shown in FIG. 13A, an organic solvent 70 for cleaning such as ethanol with high volatility is injected into the glass capillary 11 from the first end part 11B to the second end part 11A. After having washed and dried an inside of the glass capillary 11, the hollow fiber 1C is provided in the sixth preferred embodiment as shown in FIG. 13B.

In this preferred embodiment, the syringe pump is used for transportation of the solution, however, the present invention is not limited thereto. A peristaltic pump may be used instead of the syringe pump. The peristaltic pump transmits the solution by contracting the elastic tube in wavy shape. According to the peristaltic pump, it is possible to control the flow rate of the solution with high precision similarly to the syringe pump. Accordingly, it is possible to form a predetermined thin film with a substantially uniform film thickness at the inner wall of the glass capillary 11 and the surface of the Au thin film 16.

(Effect of the Sixth Preferred Embodiment)

In the hollow fiber 1C in the sixth preferred embodiment according to the present invention, the Ag thin film 12 with the substantially uniform film thickness is formed on the Au thin film 16 which is chemically stable along the longitudinal direction of the hollow fiber 1C, and an entire part of the Ag thin film 12 thus formed can be chemically changed into the silver iodide thin film 17.

Further, according to the hollow fiber 1C in the sixth preferred embodiment, it is possible to form the silver iodide thin film 17 as the transparent thin film having a substantially uniform film thickness along the longitudinal direction of the hollow fiber 1C and the surface roughness as small as the surface roughness of the inner wall of the glass capillary 11.

Further, according to the hollow fiber 1C in the sixth preferred embodiment, since the film thickness of the Au thin film 16 and the film thickness of the silver iodide thin film 17 are substantially uniform along the longitudinal direction of the hollow fiber 1C, and that the silver iodide thin film 17 has the surface roughness in the same level of the surface roughness of the inner wall of the glass capillary 11, it is possible to transmit the infrared light including a far-infrared light as well as the light with a shorter wavelength than the wavelength of the infrared light (by way of example only, the light in the visible light region) may be superimposed and transmitted as a guide light.

Still further, since the hollow fiber 1C in this preferred embodiment comprises the silver iodine thin film 17 having a surface similar to the mirror surface, the breakdown threshold can be improved, even if the laser light with the IR wavelength band is transmitted with high power. In other words, according to the hollow fiber 1C in this preferred embodiment, it is possible to transmit the light within the wavelength band from the visible light to the IR light. Therefore, it is possible to provide the hollow fiber 1C which is excellent in the long term stability and the mechanical strength.

Namely, according to the hollow fiber 1C in this preferred embodiment, the light is transmitted through the hollow region 14 reflecting at the boundary between the silver iodine thin film 17 and the Au thin film 16, so that the hollow fiber 1C can be used for transmitting the light in the transmission wavelength that cannot be used for the quartz optical fiber because of the large transmission loss and/or for transmitting the light with the high peak power. Therefore, the hollow fiber 1C in this preferred embodiment may be used for transmitting an optical energy such as light in the far-infrared region (e.g. wavelength of 2 μm or more) in the various fields, such as medical treatment, industrial work, measurement, analysis (e.g. analysis of gas composition and concentration), and chemistry. More concretely, the hollow fiber 1C in this preferred embodiment may be used for transmitting Er-YAG laser light in the wavelength band of 2.94 gm, CO laser light in the wavelength band of 5 μm, $CO_2$ laser light in the wavelength band of 10.6 μm.

According to the method for fabricating a hollow fiber in the sixth preferred embodiment, the amount of the Au nano particle solution 41 coated on the inner wall of the glass capillary 11 is very small, and the excess of the Au nano particle solution 41 is discharged from the second end part 11A and reused for fabricating another hollow fiber. Therefore, a utilization efficiency of the Au nano particle solution 41 as the source is high. Accordingly, it is possible to remarkably reduce the fabrication cost and considerably improve the production yield.

(Seventh Preferred Embodiment)

FIGS. 14A and 14B are explanatory diagrams showing a hollow fiber in a seventh preferred embodiment, wherein FIG. 14A is a partial longitudinal sectional view of the hollow fiber, and FIG. 14B is a cross sectional view of the hollow fiber along A-A line.

A hollow fiber 1D in the seventh preferred embodiment has a configuration similar to the hollow fiber 1C, except that the silver iodide thin film 17 is replaced with a copper oxide thin film 18. Therefore, detailed explanation thereof is omitted except dissimilarity.

(Structure of the Hollow Fiber 1D)

As shown in FIGS. 14A and 14B, the hollow fiber 1D in the seventh preferred embodiment comprises a glass capillary 11, a gold (Au) thin film 12 provided to cover an inner wall with a mirror surface of the glass capillary 11, a copper oxide thin film 18 formed by chemical reaction at an opposite surface of the Au thin film 16 with respect to a surface contacting with an inner wall of the glass capillary 11, and a polyimide film 13 for coating an outer surface of the glass capillary 11. The copper oxide thin film 18 in the seventh preferred embodiment serves as a transparent film with respect to the light in the IR wavelength band, similarly to the silver iodide thin film 17 in the sixth preferred embodiment.

(Process for Fabricating the Hollow Fiber 1D)

The process for fabricating the hollow fiber 1D in the seventh preferred embodiment is similar to the method for fabricating the hollow fiber 1C in the sixth preferred embodiment, until the formation of the Au thin film 16. Further, subsequent process in the seventh preferred embodiment is substantially similar to that in the sixth preferred embodiment. Therefore, only the difference therebetween will be explained below.

At first, a copper thin film is formed on the Au thin film 16 by the process similar to the process shown in FIGS. 10A to 10C and 11A. Namely, the syringe 20 is attached to the first end part 11B of the glass capillary 11 in which the Au thin film 16 is formed at the inner wall. Thereafter, a predetermined volume of a copper (Cu) nano particle solution as the second metal nano particle solution is accommodated in the cylinder 22. In the seventh preferred embodiment, an organic solvent such as hexane, toluene, and tetradecane may be used as a dispersion medium for dispersing the Cu nano particles.

Next, similarly to the process as shown in FIGS. 10B and 10C, the piston 21 of the syringe 20 is driven in a pushing direction at a constant rate. The Cu nano particle solution is drained at a constant rate from the cylinder 22 in accordance with the pushing drive of the piston 21, and the drained Cu nano particle solution is injected into the inside of the glass capillary 11. The Cu nano particle solution injected to the inside of the glass capillary 11 is coated on a surface of the Au thin film 16 formed at the inner wall of the glass capillary 11 as the Cu nano particle solution moves from the first end part 11B to the second end part 11A of the glass capillary 11. Then, the Cu nano particle solution that is not coated on the surface of the Au thin film 16 i.e. an excess of the Cu nano particle solution is discharged from the second end part 11A of the glass capillary 11 to outside of the glass capillary 11, and accommodated in the waste liquid vessel 24.

Successively, similarly to the process as shown in FIG. 11A, the glass capillary 11, in which the Cu nano particle solution is coated on the Au thin film 16, is accommodated in the electric furnace 25. While introducing an $O_2$ gas at a predetermined concentration or a gas including a predetermined concentration of oxygen into the glass capillary 11 from the first end part 11B to the second end part 11A, the high-temperature heat treatment (by way of example only, the heat treatment temperature is from 250 to 350° C.) is carried out on the glass capillary 11. According to this heat treatment, the Cu nano particle solution is oxidized and baked to provide a copper oxide, so that a copper oxide thin film 18 with a film thickness not greater than dozens of nanometers (nm) is formed on the surface of the Au thin film 16, thereby providing the hollow fiber 1D in the seventh preferred embodiment.

(Variation of the Process for Fabricating the Hollow Fiber 1D)

The variation of the process for fabricating the hollow fiber 1D in the seventh preferred embodiment is similar to the method for fabricating the hollow fiber 1C in the sixth preferred embodiment, until the step of adhesion of the Cu nano particle solution to the surface of the Au thin film 16. Further, subsequent process in the variation of the seventh preferred embodiment is substantially similar to that in the sixth preferred embodiment. Therefore, only the difference therebetween will be explained below.

At first, the Cu nano particle solution is coated on the Au thin film 16 by the process similar to the process shown in FIGS. 10A to 10C. Successively, by the process similar to the process as shown in FIG. 11A, the glass capillary 11, in which the Cu nano particle solution is coated on the Au thin film 16, is accommodated in the electric furnace 25. While introducing an inert gas (e.g. $N_2$ gas 60) into the glass capillary 11 from the first end part 11B to the second end part 11A, the high-temperature heat treatment is carried out on the glass capillary 11. According to this heat treatment, the Cu nano particle solution is baked, so that a copper thin film with a film thickness not greater than dozens of nanometers (nm) is formed on the surface of the Au thin film 16.

Next, the Cu thin film formed on the surface of the Au thin film 16 is oxidized by introducing an $O_2$ gas at a predetermined concentration or a gas including a predetermined concentration of oxygen into the glass capillary 11 from the first end part 11B to the second end part 11A. According to this process, the copper oxide thin film 18 with a film thickness not greater than dozens of nanometers (nm) is formed on the surface of the Au thin film 16, thereby providing the hollow fiber 1D in the seventh preferred embodiment.

Although the invention has been described with respect to the specific embodiments for complete and clear disclosure, the appended claims are not to be therefore limited but are to be construed as embodying all modifications and alternative constructions that may occur to one skilled in the art which fairly fall within the basic teaching herein set forth.

What is claimed is:

1. A hollow fiber, comprising:
   a hollow tube having a hollow region for transmitting a light;
   a first metal thin film formed on an inner wall of the hollow tube, the first metal thin film having a chemical stability; and
   a transparent thin film comprising a material chemically changed from a second metal thin film formed by baking metal nano particles dispersed in a solvent and provided on an opposite surface of the first metal thin film with respect to a surface contacting to the inner wall, the transparent thin film being transparent with respect to a wavelength of the light.

2. The hollow fiber according to claim 1, wherein the metal nano particles comprise silver nano particles, and the transparent thin film comprises a silver iodide formed by iodizing a silver thin film formed by baking the silver nano particles dispersed in the solvent.

3. The hollow fiber according to claim 1, wherein the metal nano particles comprise copper nano particles, and the transparent thin film comprises a copper oxide formed by oxidizing a copper thin film formed by baking the copper nano particles dispersed in the solvent.

* * * * *